Jan. 1, 1963 R. G. HOLMAN 3,071,331
BALL WINDING APPARATUS

Original Filed June 6, 1955 8 Sheets-Sheet 1

INVENTOR.
RUDOLPH G. HOLMAN
BY
ATTORNEY

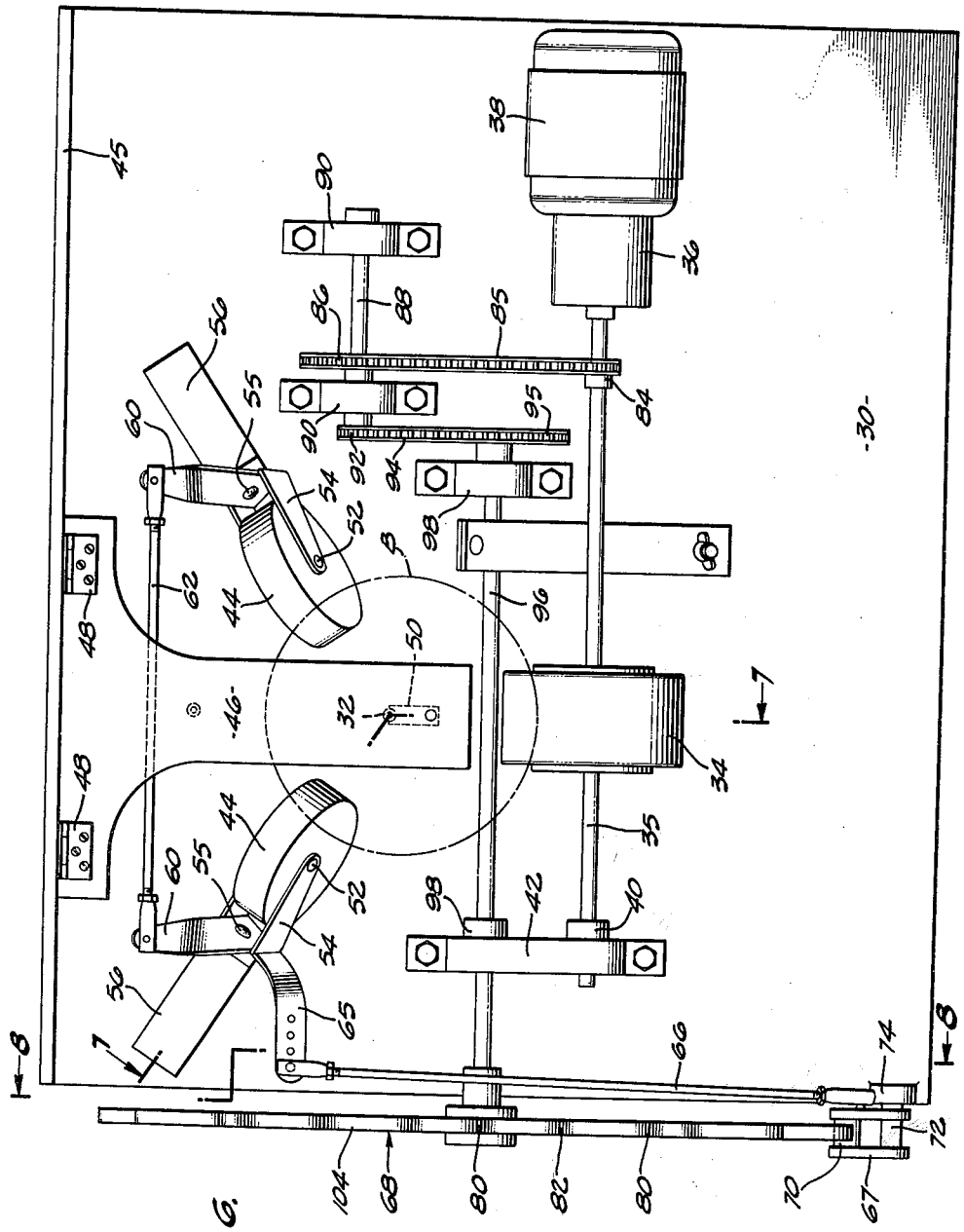

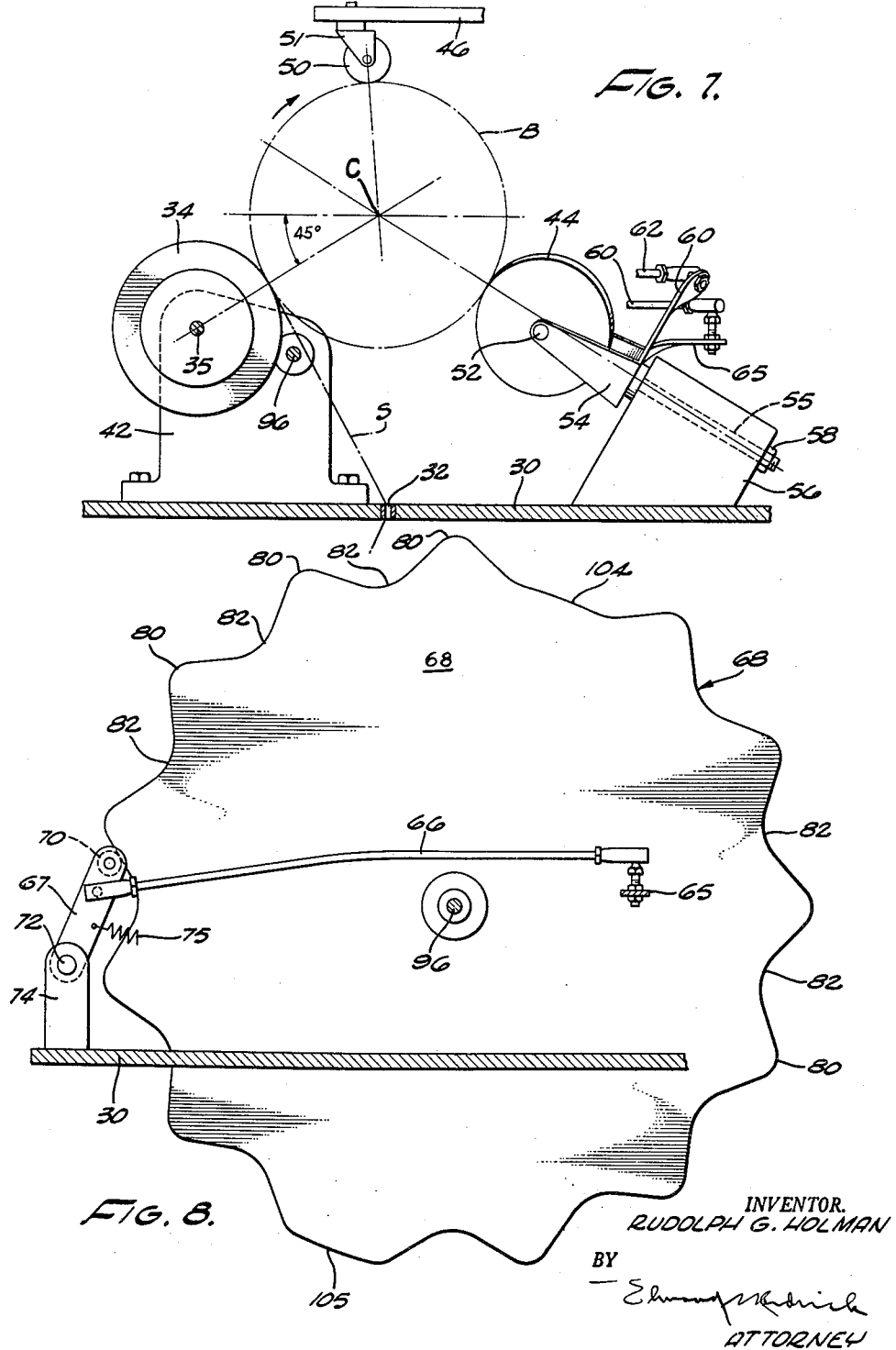

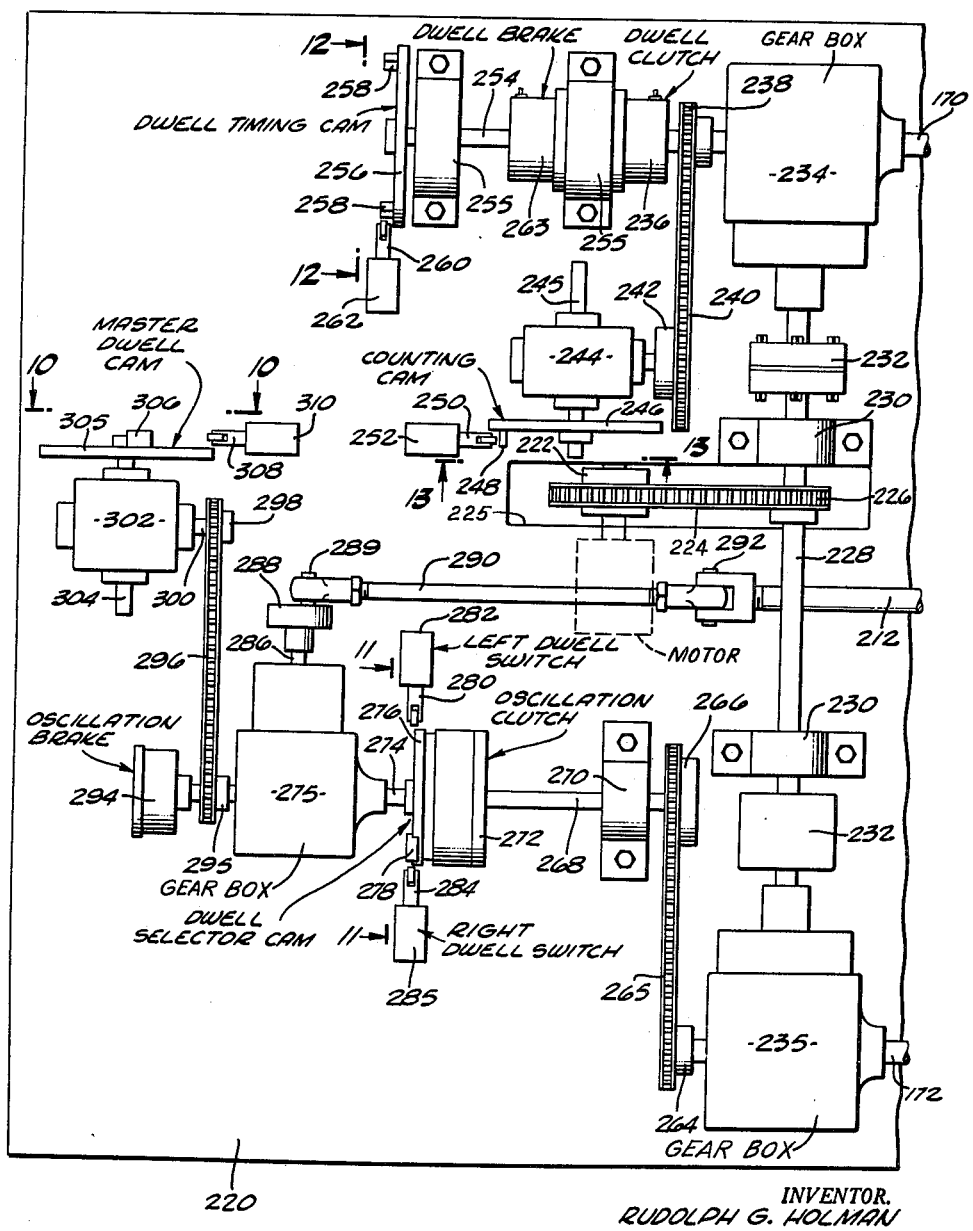

Jan. 1, 1963 R. G. HOLMAN 3,071,331
BALL WINDING APPARATUS
Original Filed June 6, 1955
8 Sheets-Sheet 5

INVENTOR.
RUDOLPH G. HOLMAN
BY
Edward M Cedrick
ATTORNEY

Jan. 1, 1963    R. G. HOLMAN    3,071,331
BALL WINDING APPARATUS
Original Filed June 6, 1955    8 Sheets-Sheet 6
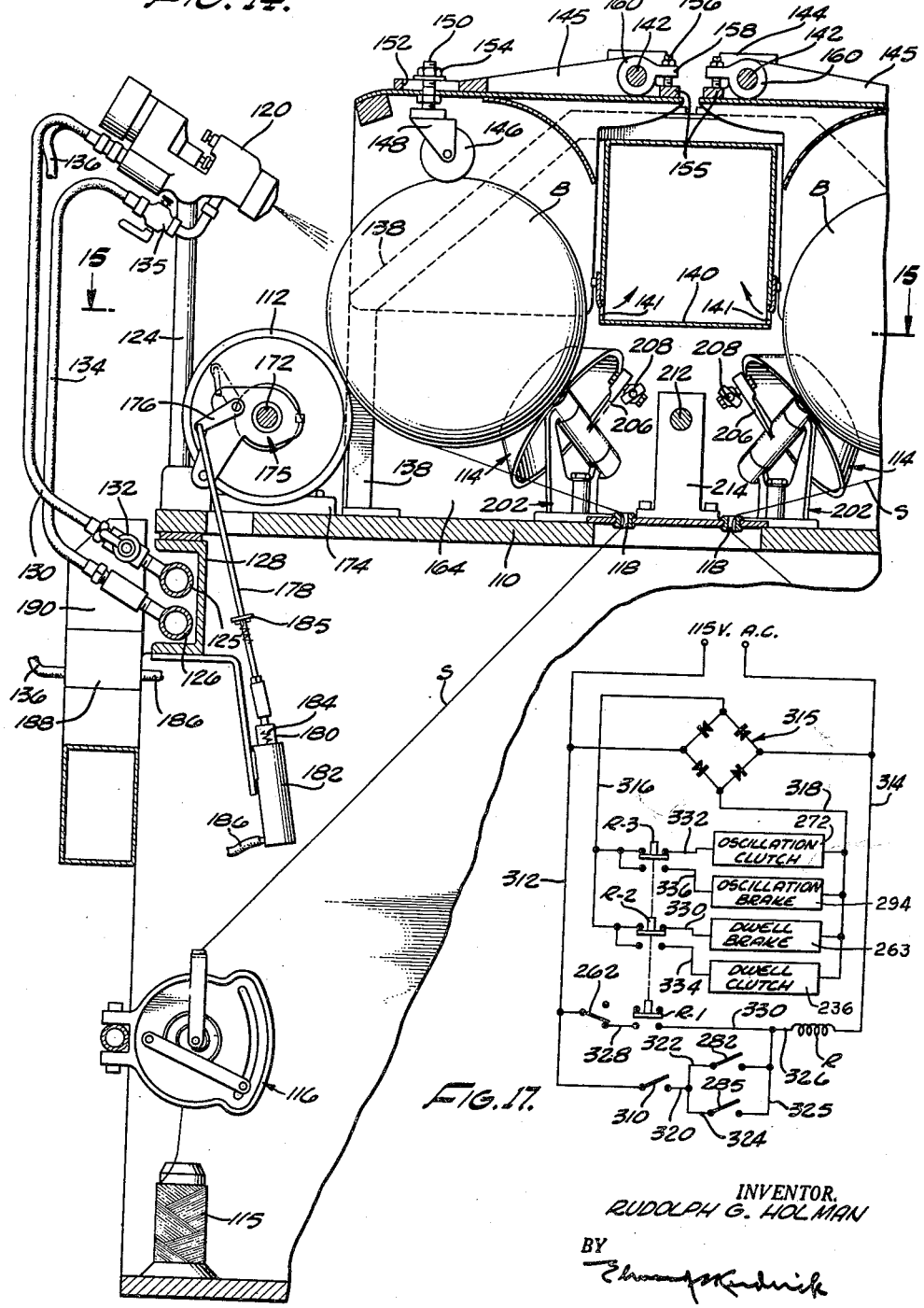
INVENTOR.
RUDOLPH G. HOLMAN
BY
ATTORNEY Jan. 1, 1963 R. G. HOLMAN 3,071,331
BALL WINDING APPARATUS
Original Filed June 6, 1955 8 Sheets-Sheet 7
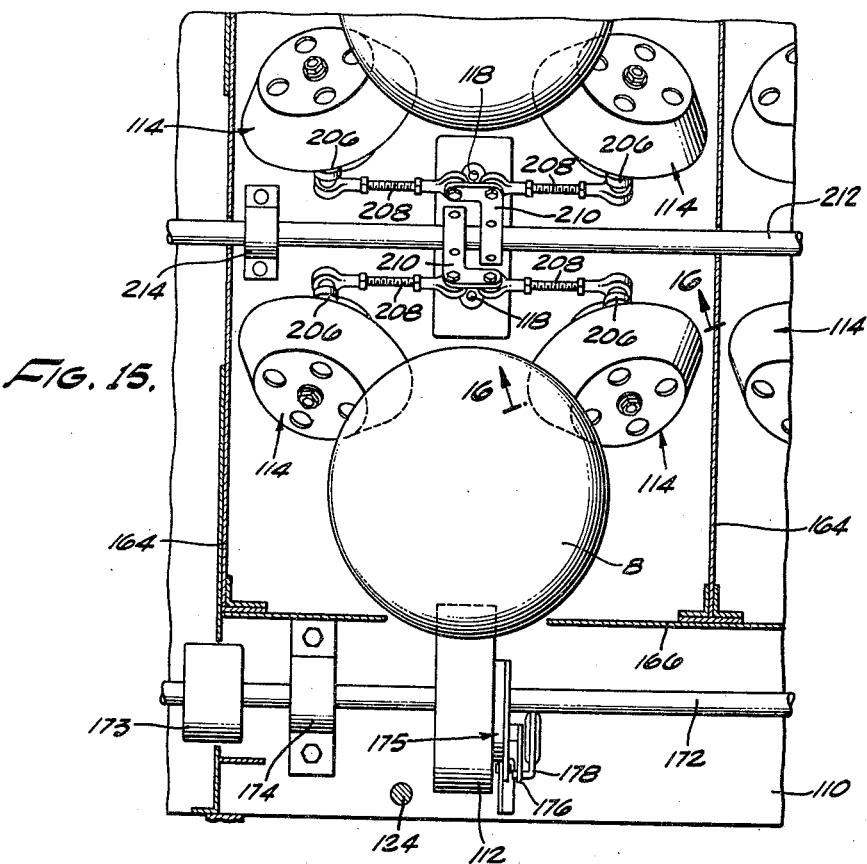
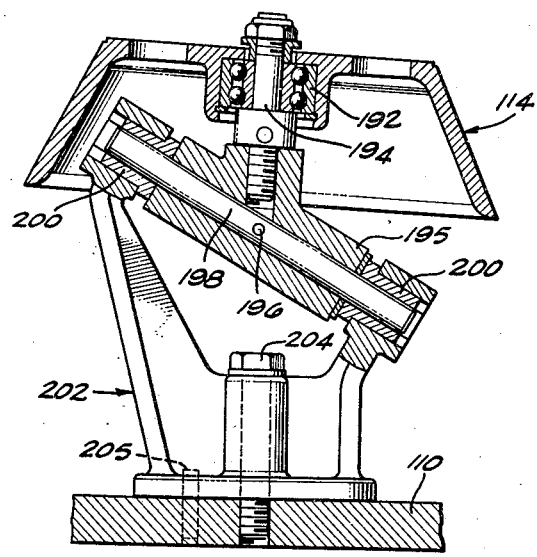
INVENTOR.
RUDOLPH G. HOLMAN
BY
*Edward M Kendrick*
ATTORNEY

INVENTOR.
RUDOLPH G. HOLMAN

BY

ATTORNEY

United States Patent Office 3,071,331
Patented Jan. 1, 1963

3,071,331
BALL WINDING APPARATUS
Rudolph G. Holman, La Habra, Calif., assignor to W. J. Voit Rubber Corp., Los Angeles, Calif., a corporation of California
Original application June 6, 1955, Ser. No. 513,280. Divided and this application Jan. 22, 1957, Ser. No. 635,514
29 Claims. (Cl. 242—3)

This invention relates to a method of and apparatus for winding a filamentary material on spherical bodies.

This application is a division of my copending parent application Serial No. 513,280 filed June 6, 1955, for Ball Winding Method and Apparatus, now abandoned, and refiled as continuation-in-part application Serial No. 754,551, filed August 12, 1958, entitled, Ball Winding Method and Apparatus. The subject matter disclosed and originally claimed in the parent application and in the continuation-in-part application, now also includes the divisional application Serial No. 142,272, filed October 2, 1961, entitled Method of Winding a Ball; and the subject divisional application, Serial No. 635,514, filed January 22, 1957, entitled, Ball Winding Apparatus.

Although the invention is widely applicable for its basic purpose, e.g. even on pressure accumulators, it is being initially applied to the production of relatively large balls such as volley balls and basketballs. This particular practice of the invention as disclosed herein by way of example will provide adequate guidance for those skilled in the art who may have occasion to apply the same principles to other specific purposes.

In the winding of a ball core or an inflated bladder with filamentous material to fabricate a ball for sport and recreational use, the object is to achieve substantially uniform distribution of the windings over the spherical periphery of the ball wtih the windings extending in all directions. It is especially important to avoid contour irregularities arising from local concentrations of overlaps of the wound material. It is also structurally important to have the individual turns approach as closely as possible great circles. The windings cannot precisely follow great circles, however, since the windings are necessarily serially interconnected and consequently continual change in winding direction is necessary for acceptable distribution of the individual terms.

The usual approach to the problem of winding a ball is to avoid close control of the individual turns and simply to seek random distribution. Such close control as would produce a recognizable predetermined winding pattern is avoided.

The heretofore prevalent procedure for winding a ball, for example, a soft baseball, is to rest the ball structure in a freely rotatable manner on two closely adjacent parallel cylindrical rolls and to rotate the two rolls in the same rotary direction while simultaneously reciprocating the two rolls longitudinally along their axes. The result is far from such control as would produce an ascertainable winding pattern in which identical winding cycles are continually repeated and in which a definite predetermined relationship between the successive cycles may be detected simply by inspecting a finished ball.

A serious disadvantage of this prior art method, moreover, is that adequately random distribution of the windings requires relatively drastic reciprocation of the two rolls for continually drastic bias of the individual windings away from ideal great circle windings. Thus the individual windings of the finshed ball are typically wide departures from great circles rather than approximations of great circles and great circle turns are approached only infrequently when the two rollers pause at the limits of their ranges of reciprocation.

The broad object of the present invention is to provide a wound ball with a readily recognizable accurately predetermined winding pattern that results in efficient use of the winding material. The winding pattern may be readily detected in a finished ball since it comprises relatively short accurately predetermined winding cycles which are exactly identical with each other and are successively shifted over the spherical area of the ball in an accurately predetermined manner. Efficiency in the use of a winding material is obtained, first, in the sense of achieving complete uniform coverage with minimum yardage and, second, in the sense of typically closely approaching great circles in the individual turns.

Each of the successive winding cycles comprises a group of turns resembling a series of intersecting great circles of longitude on a globe representing the earth. This group of turns is produced during a wind period, or a winding cycle, of the machine. Thus, the successive individual turns of a winding cycle intersect in two diametrically opposite polar regions of the ball, just as the imaginary lines of longitude intersect at the two opposite polar regions of the earth. The transition from one winding cycle to another is accomplished simply by continuing the final turn of a cycle along a true circle, which may be a great circle, for a predetermined fraction of a turn and then repeating the winding cycle with the ensuing successive group of turns intersecting at a new pair of polar regions. The new pair of polar regions is displaced from the preceding pair by a predetermined distance, or sector of a circle, in a predetermined relative direction.

While the new winding pattern may be controlled and predetermined with high precision it is, nevertheless, exceedingly flexible in that the pattern may be widely varied in various definitely known respects within the judgment exercised by those skilled in the present art. As will be explained there are four distinct variables over which control may be exercised selectively.

Further objects of the invention relate to the winding method as well as to the apparatus for carrying out the method.

The various objects and features of the invention will be apparent from the following detailed description considered with the accompanying drawings.

In the drawings, which are to be regarded as merely illustrative:

FIG. 6 is a plan view of one form of apparatus that may be used to carry out the invention;

FIG. 7 is a sectional view taken as indicated by the angular line 7—7 of FIG. 6;

FIG. 8 is a section taken as indicated by the line 8—8 of FIG. 6, showing the configuration of a control cam of the apparatus;

Figure 9B:
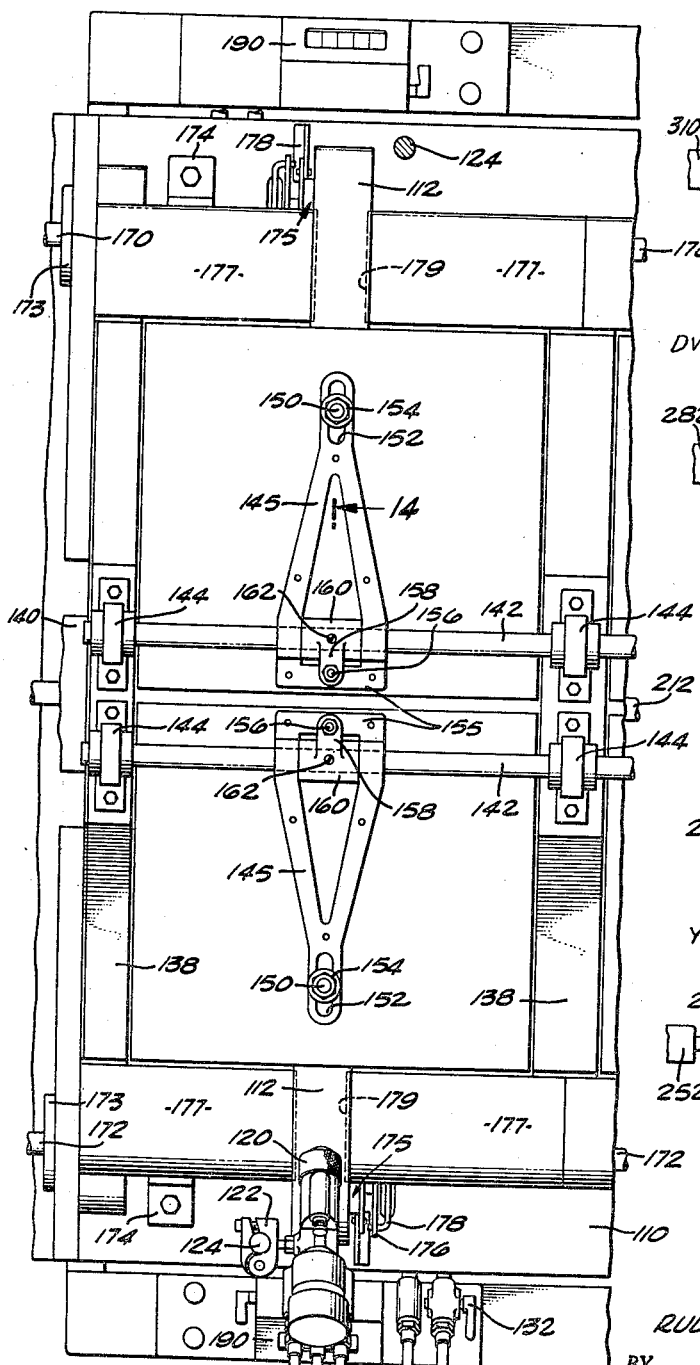
Figure 10:
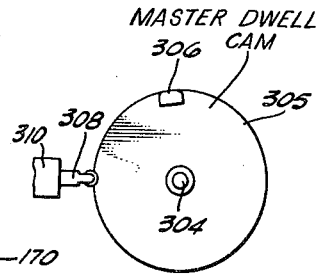
Figure 11:
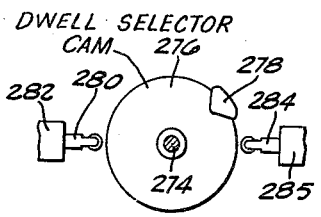
Figure 12:
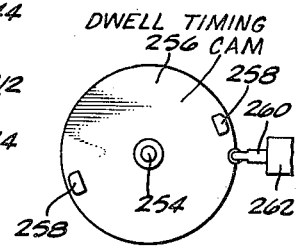
Figure 13:
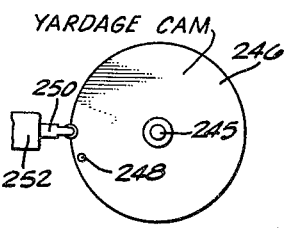
Figure 18:
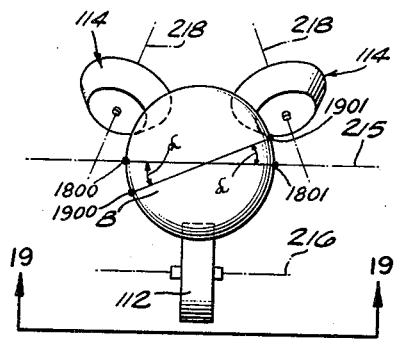
Figure 19:
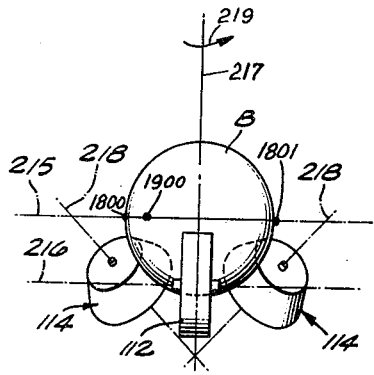
Figure 20:
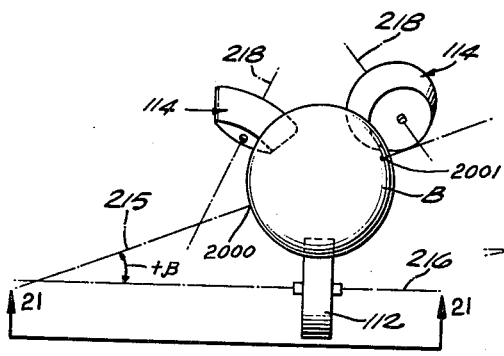
Figure 21:
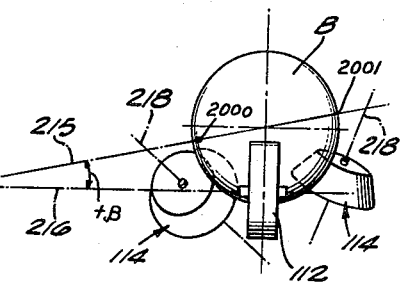
Figure 22:
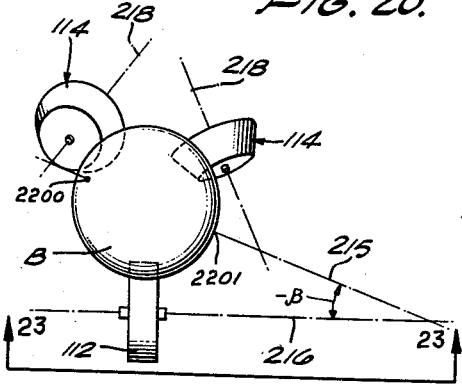
Figure 23:
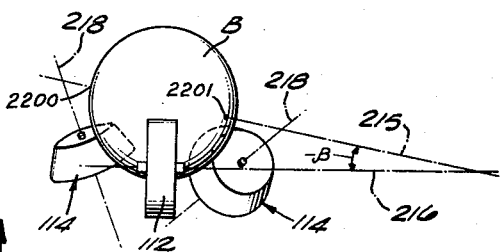

FIGS. 9a and 9b taken together are a plan view of a second form of apparatus having multiple winding stations;

FIG. 10 is a face view of a master dwell cam of the apparatus as seen along the line 10—10 of FIG. 9a;

FIG. 11 is a face view of a dwell-selector cam of the apparatus as seen along the line 11—11 of FIG. 9a;

FIG. 12 is a face view of a dwell-timing cam as seen along the line 12—12 of FIG. 9a;

FIG. 13 is a face view of a counting cam of the apparatus as seen along the line 13—13 of FIG. 9a;

FIG. 14 is a vertical sectional view of a portion of the apparatus along the line 14—14 of FIG. 9b, showing the winding mechanism at one of the winding stations;

FIG. 15 is a horizontal sectional view along the line 15—15 of FIG. 14;

FIG. 16 is a fragmentary section taken as indicated by by the line 16—16 of FIG. 15;

FIG. 17 is a wiring diagram of the control system used in the apparatus shown in FIGS. 9a and 9b;

FIG. 18 is a simplified plan view of the winding mechanism at a winding station of the apparatus, the mechanism being shown at one stage of the winding operation;

FIG. 19 is a front elevational view taken in the direction of arrows 19—19, FIG. 18, of the structure shown in FIG. 18;

FIG. 20 is a plan view similar to FIG. 18 at another stage in the winding cycle;

FIG. 21 is a front elevational view taken in the direction of arrows 21—21, FIG. 20, of the structure shown in FIG. 20;

FIG. 22 is a plan view similar to FIGS. 18 and 20 showing the winding mechanism at still another stage in the winding cycle; and FIG. 23 is a front elevational view of the structure shown in FIG. 22, taken in the direction of arrows 23—23, FIG. 22.

Figure 1:
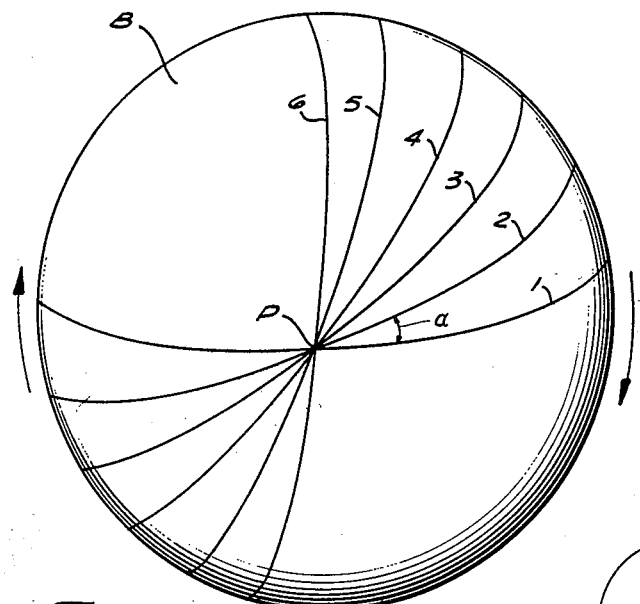
FIG. 1 is a simplified or diagrammatic view of a sphere showing a group of winding turns constituting a selected winding cycle of the invention, this winding cycle being repeated with successive displacements over the whole spherical area to produce a completely wound ball.

FIG. 1 which represents a ball in the process of being wound, shows a typical group of turns produced during a single winding cycle; the group comprising six turns of thread wound around a ball B, the successive turns of the cycle being numbered 1 to 6. In this instance, all of the turns produced during the cycle intersect at two polar points P, there being two such polar points at diametrically opposite positions on the periphery of the ball. The successive turns of the group produced during the winding cycle are displaced approximately 15° as measured by the angles at the polar points P. Thus the total displacement for the cycle, and the group, is 90° and the completed cycle covers approximately two diametrically opposite quadrants of the spherical area of the ball.

Figure 2:
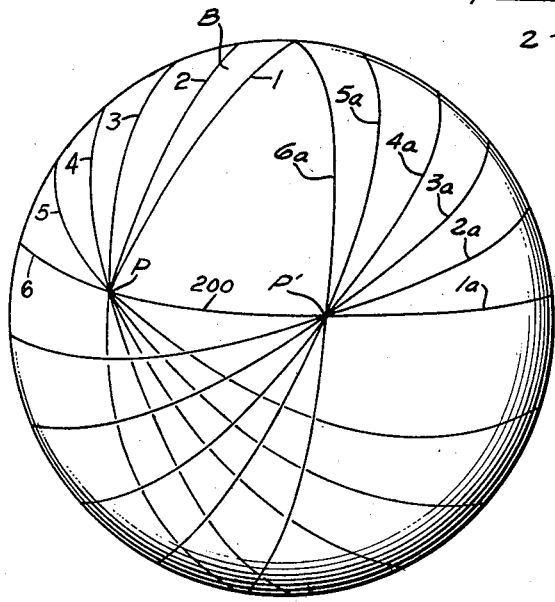
FIG. 2 is a similar view showing a second succeeding winding cycle added to the first winding cycle to show the geometrical relationship between successive winding cycles.

FIG. 2 shows the next succeeding winding cycle comprising six identical turns, numbered 1a to 6a, intersecting at a pair of diametrically opposite pole points P'. It is to be noted that the initial turn 6 of the first winding cycle, numbered as turn 6 in FIG. 2, is continued along a small circle path 200, which may span an angle such as from 20° to 80°, and 100° to 170°, so that the two adjacent polar regions P and P' are spaced apart on this continuation turn. The circular distance P—P', which is a sector, or an arc, is, of course, a fraction of a circle. In the same way, a third successive winding cycle, which is not shown in FIG. 2, would start with the continuation of the turn 6–a and one of the poles of the third winding cycle would be on the turn 6–a. It is apparent that the paths described by the successive pairs of poles will conform to some particular geometrical pattern, the selected pattern of pole migration being such as to achieve the desired uniform distribution of the wound material over the spherical area of the ball.

Figure 3:
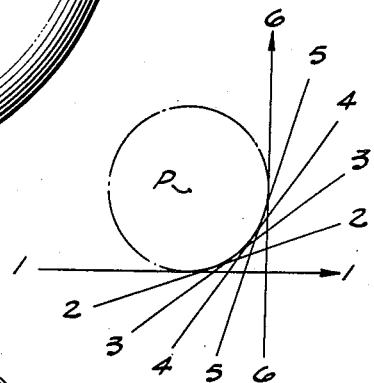
FIG. 3 is a similar fragmentary view showing how the intersections of the individual turns of a winding cycle may be dispersed over a polar region.

The previously mentioned four variables that may be controlled selectively for covering of a ball may now be explained. What may be termed the first variable is the spacing or angular displacement of the successive turns of a winding cycle as measured by the angles of intersection of the successive turns at the two polar regions of the winding cycle. The second variable afforded by the invention is the concentration of the intersections at the two polar regions formed during each winding cycle. Theoretically, the intersection of the successive turns produced during a single cycle produces two precise polar points, as shown in FIGS. 1 and 2. In practice, no such concentration of the intersections at a geometric point is accomplished. Actually, there is a dispersal of the successive intersection points over a polar region. In practice the dispersed intersection points fall along a line that curves concentrically of an imaginary polar point. Thus in FIG. 3 the intersections of the turns of a winding cycle lie on a circle indicated by a dotted line instead of being concentrated at a single polar point.

The third variable is the number of turns and consequently the number of polar intersections in a winding cycle. Finally the fourth variable is the displacement of each pair of poles from the next previous pair which is produced by the machine during the so-called "pause" period. The meaning of the "pause" in this case is that the ball is rotated during the pause period around a stationary-in-space axis, and this axis is not oscillated in the course of the rotation of the ball. During the wind period, this axis is oscillated. Therefore, the term "pause" refers to the pause in the oscillation of the axis.

In the presently preferred practice of the invention the angular displacement of the successive turns of a winding circle is approximately 15°, as shown in FIGS. 1 and 2, and the successive turns of a winding cycle intersect at two polar regions. The preferred winding pattern is further characterized by six turns in each winding cycle and each of the diametrical pair of poles is displaced from the preceding pair by about one-third of a circle, which may be a great circle, or approximately 120 degrees in the circular direction of the last turn of the preceding cycle. Each cycle covers approximately two quadrants or approximately half the surface of the ball by means of six turns produced during the wind period.

The circular arc which is followed during the dwell, or the pause, period, i.e., when rod 212 is at a standstill, may be anywhere from 20° to 80° and 100° to 170°, the 120° arc being preferable to the shorter arc, such as 20° to 80°, because the disclosed system is timed by means of mechanical cams, relays and switches and it is simpler to adjust them for proper timing and consistent operation when the arc is longer. The preferred arc is 120° because it produces a more uniform dispersion of the turns over the entire surface of the ball.

It can be readily appreciated from the foregoing discussion that other combinations of the four variables may be selected in various practices of the invention. In this regard a feature of the invention is that random manipulation of the four variables by a person skilled in the art without special care or forethought is more likely than not to result in a superior winding pattern that affords full and uniform coverage of the ball with only moderate yardage of the winding material.

It is possible, of course, to pile up excessive intersections at local points by deliberately seeking to do so and using an inordinately large number of turns for each winding cycle. If the polar intersections are dispersed in the general manner shown in FIG. 3, however, there is great latitude in the number of turns that can be used for each winding cycle. It is possible, too, to cause the poles to overlap with undesirable effects. In actual practice, however, there is a high probability that random manipulation of the fourth factor will result in substantially uniform distribution of the successive polar regions over the spherical area of the ball.

Figure 4:
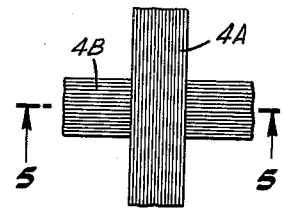
FIG. 4 is a fragmentary plan view on an enlarged scale of an intersection formed by an untwisted strand comprising a number of separate filaments.
Figure 5:
FIG. 5 is a sectional view of the intersection along the line 5—5 of FIG. 4.

A feature of the preferred practice of the invention is the concept of employing a winding strand that comprises a bundle of separate and more or less parallel elements instead of a single twisted or cord-like strand. In this particular practice of the invention the strand comprises 34 nylon filaments and the 34 filaments are so small that they can be bunched together to form a compact mass having a cross-sectional dimension on the order of magnitude of .002 to .003 inch, although larger diameters up to .012 of an inch may be used. One important advantage of employing such a multiple-filament strand is that the strand flattens out to provide greater coverage by each winding turn than can be accomplished with a twisted cord. Another advantage of special importance is that the strands flatten out to make relatively shallow intersections. FIGS. 4 and 5, for example, show such an intersection of filaments 4A and 4B in a simplified manner on an enlarged scale. It is apparent that the multiple-filament strand behaves more like a thin ribbon than a twisted cord. In practice it is desirable to give some twist to the strand of 34 filaments, say a twist of 7 turns per inch, but with this mild twist the strand tends to flatten in substantially the manner indicated in FIGS. 4 and 5. The test is whether or not the multiple-filament strand tends to wind more in the manner of a ribbon than in the manner of a solidly cylindrical cord.

Although the nylon strand comprises a comparatively large number of filaments, the strand is exceedingly fine in contrast to the cross-sectional dimension of winding material that is usually employed for this purpose. Relatively fine strands have been employed heretofore in some instances but to my knowledge, not in the form of untwisted or only loosely twisted multiple-filament strands.

The advantages of using a strand of nylon filaments for a ball "carcass" i.e., the layer between the inner bladder and the outer cover, has the following advantages over prior art practices.

(1) Adequate coverage and more than adequate strength are obtained with less total weight of material. The official weight of a basketball is 21 ounces with a tolerance of plus or minus one ounce. The lightening of the wound layer without sacrifice in strength makes it possible to increase either the weight of the inner bladder, or the weight of the outer cover, or both, as may be desired, without exceeding the regulation weight. When the usual twisted thread or cord is used, however, the need for coverage dominates the need for strength and an excessive amount of the winding material must be used to provide adequate coverage.

(2) While the nylon material is more costly per pound than the usual winding material, there is so much less weight required for adequate coverage and strength that there is actually a saving in material cost.

(3) The larger the number of well distributed turns in a winding layer, the nearer the finished layer approaches uniformity in character and thickness. The wound layer of a basketball produced as herein taught has several times as many turns as found in the usual wound ball. The flattening of the mildly twisted strand of filaments also contributes to the uniformity of the wound layer in providing more coverage per turn and in reducing the thickness of intersections.

(4) The wound layer of nylon provides a relatively thin carcass for the ball. A relatively thin wound carcass is less likely to fatigue and fail than a relatively thick wound carcass because less internal friction and stress in compression and tension are involved in the flexing of a thin layer than in the stressing of a thick layer. It is also to be pointed out that the more intricate and efficient the distribution of the winding material, with more strands per unit area, as provided by the present invention, the less the possibility of local weakness developing anywhere in the carcass. Since the new carcass is relatively light in weight, longer life may be further favored, within the total weight limitation, by either thickening the bladder or the cover, or both, as heretofore stated.

(5) The use of a relatively thin wound layer composed of a relatively fine nylon strand, as described herein, makes it possible to obtain substantially uniform tensioning of the windings in the finished ball in a manner not possible with thicker wound layers of the character heretofore employed. If an inflated bladder is wound with a strand under tension, the outer wound layers tend to remove the tension of the inner layers. On the other hand, if the strand is wound under substantially no tension, the expansion involved in the final cure of the ball places the inner windings under high tension and leaves the outer windings relatively slack. This effect may be understood when it is considered that the inner windings are subjected to a higher percentage of circumferential expansion than are the outer layers. The present invention solves this dilemma, in part, by using a relatively thin wound layer to narrow the circumferential differential between the inner windings and the outer windings; in part, by winding the strands under appreciable tension to cause a certain degree of relaxation of the inner windings which is automatically removed in the subsequent high pressure expansion for the final cure; and, in part, by employing a nylon strand having no significant degree of twist. An untwisted strand stretches less than a twisted strand and it has been found that nylon behaves in the winding and curing stages in a manner that is conducive to the desired final uniform tensioning of the strand in the wound carcass.

(6) Since there is a substantial saving in weight in the wound layer, it is possible to impregnate the wound layer with various materials for various purposes and still keep the total weight of the wound layer relatively low. The impregnating material may be primarily an adhesive, or may be a sealing material for air retention, or may be applied primarily to fill up the voids in the wound layer. In the preferred practice of the invention a suitable adhesive is sprayed onto the ball as the newly laid nylon strand is laid in the winding operation. The sprayed material anchors the wound strand in place and in addition impregnates the strand.

The first and simpler form of apparatus for carrying out the described method of winding a ball is shown in FIGS. 6, 7 and 8. The apparatus includes an elevated base plate 30 with a small sleeved aperture 32 therein, through which a strand S may extend upward from a source below the base plate to wind onto a ball B.

A suitable drive roller 34 for rotating the ball B is positioned for peripheral tangential contact with the ball and for this purpose is mounted on a drive shaft 35. The drive shaft 35 extends from a gear box 36 on a motor 38 and is supported at its outer end by a bearing 40 in an upright bearing support 42.

Two idler rollers 44 located on opposite sides of the plane of rotation of the drive roller 34 are positioned for peripheral tangential contact with the ball B at two spaced points on opposite sides of the plane of rotation of the drive roller 34. The two idler rollers 44 cooperate with the drive roller 34 to form a three-point seat for supporting the ball B. The two idler rollers 44 are positioned at least 120 degrees from the drive roller 34 and are not more than 120 degrees apart. Preferably the two idler rollers are less than 120 degrees apart since lessening this spacing increases the pressure of the drive roller 34 on the ball when the ball is pressed into the three point seat.

Any suitable arrangement may be used to releasably hold the ball B in the three point seat provided by the drive roller 34 and the two idler rollers 44. In the present apparatus an upright plate 45 at the rear edge of the base plate 30 is provided and an upper forwardly extending arm 46 is mounted on the upright plate 45 by hinges 48 to weigh down the ball B. As best shown in FIG. 7 the arm 46 for pressing the ball down to the three-point seat is provided with a small roller or caster 50 in a swiveled bracket 51. The arm 46 may be swung upward out of the way whenever it is desired to replace a ball in the three-point seat.

Each of the two idler rollers 44 is mounted by an axle 52 in a bracket 54 having a pivot shank 55. The pivot shank 55 is rotatively mounted in a suitable bearing 56 and is retained therein by a nut 58. Each of the two brackets 54 for the two idler rollers has an operating arm 60 to cause oscillation of the idler roller about the axis of its pivot shank and these two operating arms are interconnected by a link 62. By virtue of this link the two idler rollers 44 may be oscillated in a synchronous manner. One of the idler roller brackets 54 is provided with a second operating arm 65 which is connected by an operating rod 66 to a rocker arm 67 controlled by a relatively large cam wheel 68. The rocker arm 67, which comprises two parallel interconnected bars carries a roller 70 at its upper end which functions as a follower in contact with the periphery of the cam wheel 68. The rocker arm 67 is mounted by a pivot 72 on an upright support 74 and is continuously pulled towards the periphery of the cam wheel by a suitable coiled spring 75.

It will be noted in FIG. 7 that the axis of oscillation of an idler roller 44 i.e. the axis of the shank 55 of the idler roller bracket is on a diameter of the idler roller and passes through the point at which the periphery of the idler roller makes tangential contact with the ball B. Preferably, this axis intersects the center C of the ball B and is inclined downward from the ball center C. The angle of downward inclination relative to the horizontal may be on the order of 45 degrees, the angle being somewhat less than 45 degrees in this particular embodiment of the invention. Note also in FIG. 7 that the axis of the drive roller 34 is positioned 45° downward from the center of the ball B. None of these angles is critical, however.

The cam wheel 68 has a periphery with an undulating configuration forming alternate peaks 80 and valleys 82. As the follower 70 on the rocker arm 67 traverses the periphery of the cam wheel 68 from one peak to the next succeeding peak or from one valley to the next succeeding valley the two idler rollers 44 make one complete oscillation about the corresponding pivot shanks 55, each idler roller swinging from one limit position to the opposite limit position and back to the first limit position. As heretofore stated, the time interval of one such complete oscillation of the two idler rollers 44 approximates the time interval of one complete rotation of the ball B by the drive roller 34.

Any suitable arrangement may be used to actuate the cam wheel 68 in the desired time relation to the ball B. In the present embodiment of the apparatus, the cam wheel 68 is operatively connected to the drive shaft 35 that carries the driver roller 34. For this purpose a sprocket 84 on the drive shaft 35 is connected by a sprocket chain 85 with a sprocket 86 on a counter shaft 88. The counter shaft 88, which is mounted on a pair of bearings 90, carries a sprocket 92. The sprocket 92 is connected by a sprocket chain 94 with a sprocket 95 on a shaft 96. The shaft 96 is journaled in a pair of bearings 98 and carries the cam wheel 68.

The particular cam wheel 68 shown in FIG. 8 is designed to create successive substantially identical winding cycles of approximately 6½ turns each. For this purpose the cam wheel has two sets or series of 6 peaks 80, and these two series of 6 peaks each are separated by a lower dwell or expanded valley 104 and by an upper dwell or expanded peak 105, these two dwells being substantially 180 degrees apart. In this instance each of the two dwells has a circumferential length that is approximately ⅓ of the circumferential distance from one peak 80 to the next succeeding peak. Since the peak-to-peak distance represents substantially one rotation of the ball, each of the two dwells corresponds to approximately ⅓ of a rotation of the ball.

The manner in which the described apparatus carries out the process of winding a ball may be readily understood. The oscillation of the two idler rollers 44 about their points of contact with the ball B is substantially frictionless with no dragging effect on the ball. The inclination of the drive rollers in opposite directions in the course of a single rotation of the ball causes the currently applied winding on the ball to be biased first in one direction for approximately 180 degrees of rotation of the ball and then to be biased in the opposite direction for the remainder of the rotation. As a result, the successive turns around the ball intersect in two diametrically opposite polar regions with an angular displacement of approximately 15 degrees between the successive turns. In this manner the strand S is wound on the ball B in winding cycles of 6½ turns each. At the end of each of these winding cycles there is a pause in the oscillation which causes the winding to continue just off great circles for approximately ⅓ of the circumference of the ball to start a new winding cycle.

The heretofore mentioned first variable in the winding cycle comprising the angular displacement of the successive turns of a winding cycle as measured at the two poles is determined by the amplitude of the oscillations of the two idler rollers 44, i.e., by the radial differential between the peaks 80 and the valleys 82 of the cam wheel 68. This radial differential may be varied at will.

The second variable or the concentration of the intersections of the windings at the two polar regions of a winding cycle depends upon the time ratio between the oscillations of the idler rollers 44 and the rotations of the ball B. With the rollers oscillating in exact phase with the rotation of the ball B, the intersections are concentrated at two precise polar regions. Although theoretically, the intersection of the threads at the poles should be of the type illustrated in FIG. 1, i.e., at a geometric point "P," in actual practice such point concentration is never obtained because there is always a slight variable slippage between the ball and the drive roller 34, with the result that instead of a single point, the six turns form a small area over which the intersections are dispersed. Such imperfect functioning of the machine in this case happens to be desirable because intersection of all the turns produced during the single cycle at a point, would produce high spots in the winding, which are undesirable. Accordingly, such dispersal of the turns over a region produces a smoother winding. If desired the drive sprocket 84 may be either enlarged or reduced to make the peak-to-peak rotation of the cam wheel slightly out of phase with the rotation of the ball to result in a still further polar dispersal of the intersections in the two polar regions of each winding cycle.

The third variable, which is the number of turns in a winding cycle, may be increased or reduced by increasing or reducing the number of peaks and valleys on the cam wheel in each of the two series of peaks and valleys. In this regard it is to be noted that the two series of peaks and valleys on the cam wheel 68 need not be equal. Thus, instead of two operating cycles of approximately 6½ turns each, the cam wheel 68 could be shaped to cause one operating cycle of 8½ turns followed by an operating cycle of 4½ turns. In such an arrangement the alternate winding cycles would be identical.

The fourth variable, which is the displacement of each diametrical pair of poles from the next previous pair depends upon the circumferential extent of the two dwells 104 and 105. Obviously, it is a simple matter to vary the circumferential dimensions of these dwells, and, of course, the two dwells need not both be of the same circumferential dimension.

The second form of the apparatus, shown in FIGS. 9a to 17, provides a plurality of winding stations positioned back to back in two parallel rows, the two rows of stations being mounted on two elevated co-planar platforms or base plates 110. Each of the winding stations has a drive roller 112 and two beveled idler rollers 114 which cooperate to provide a three-point seat for supporting a ball B.

At each of the winding stations a strand S is supplied by a spool 115 and controlled by a well known type of automatic tensioning device 116. The strand S is led upward through a sleeved aperture 118 to the periphery of the ball as shown in FIG. 14.

At each winding station an atomizer or spray head 120 is adjustably mounted by a jaw-type holder 122 on an upright support rod 124. The various spray heads are supplied by a compressed air supply pipe 125 and a liquid supply pipe 126 which are housed in a longitudinal channel 128 along each row of stations. Air from the supply pipe 125 is supplied to each of the spray heads 120 through a flexible hose 130 controlled by a valve 132 and liquid from the supply pipe 126 is fed to the spray head through a hose 134 having a valve 135. A third hose 136 is connected to each spray head for remote control of the operation of the gun by air pressure. In the presently preferred practice of the invention the liquid supplied by the pipe 126 is a coumarone-indene resin but other adhesive or sealing liquids can be used in various practices of the invention.

The two rows of winding stations are provided with a frame structure 138 which carries a central exhaust duct 140 for removing vapors released by the various spray heads. This duct has intake ports 141 at the various winding stations. Mounted on top of the frame structure 138 is a pair of shafts 142 journaled in spaced bearings 144. Rotatably mounted on these shafts 142 are a plurality of overhanging arms 145, there being one arm at each winding station to weight down a ball B. Each of these overhead arms 145 carries a small pressure roller or caster 146 in a swivel bracket 148. The swivel bracket 148 has a shank 150 that extends through a longitudinal slot 152 in the overhead arm and is adjustably retained therein by a pair of nuts 154.

Each of the overhanging arms 145 is independently rotatable on the corresponding shaft 142 and may be individually swung up and back manually to permit replacement of a ball at the winding station. If desired, however, all of the overhanging arms 145 on either of the two shafts 142 may be raised simultaneously by rotation of the shaft. For this purpose each of the overhanging arms 145 has a rearwardly extending flange 155 which normally rests against an adjustable screw 156 carried by a finger 158. The finger 158 is unitary with a sleeve 160 that is fixedly mounted on the corresponding shaft 142 by a set screw 162. It is apparent that rotation of a shaft 142 in a direction to depress the fingers 158 thereon will cause all of the overhanging arms 145 on the shaft to be rotated upward.

Each of the winding stations is largely enclosed by a suitable hood structure to cause the vapors released by the spraying operation to be confined and drawn off by the exhaust duct 140. The hood structure for each winding station includes two side walls 164 (FIG. 15) and an upper wall structure 166 carried by the corresponding overhanging arm 145.

All of the drive rollers 112 of one of the two rows of winding stations are rotatably mounted on a common drive shaft 170 and all of the drive rollers of the other row of winding stations are mounted on a second similar drive shaft 172. These two shafts, which may be made in several sections connected by couplings 173, are journaled in spaced bearings 174. Preferably each of the drive shafts 170 and 172 is provided with a curved guard 177, which guard has gaps 179 to clear each of the drive rollers 112.

Each of the drive rollers 112 is operatively engageable with the corresponding drive shaft by means of an individual clutch 175 that is controlled by a rocker arm 176. The rocker arm 176 of each clutch 175 is connected by a link 178 with a piston 180 of an air cylinder 182 for remote control of the clutch by compressed air. A suitable coiled spring 184 connected at one end to a clip 185 on the link 178 and connected at the other end to the air cylinder 182 normally holds the clutch in engagement to drive the roller 112. When compressed air is admitted to the air cylinder through a control hose 186, the clutch is disengaged in opposition to the tension of the coiled spring.

The delivery of compressed air to the control hose 186 is governed by a valve 188 that is adapted for electrical actuation by a corresponding counter 190, there being a counter at each of the winding stations. The counter 190 is energized by electrical pulses generated at a central control station, as will be explained, and may be set to predetermine the yardage of the strand S that is wound on each of the balls B. The counter progresses to its zero position from whatever yardage value at which it may be set and then actuates the valve 188. Actuation of the valve 188 not only delivers compressed air to the control hose 186 to disengage the clutch 175 for stopping the winding operation at the winding station but also delivers compressed air to the previously mentioned control hose 136 to stop operation of the corresponding spray head 120.

As best shown in FIG. 16 each of the beveled idler rollers 114 is mounted by a ball bearing 192 on a spindle 194 that is carried by an inclined sleeve 195. Inclined sleeve 195 is fixedly held by a screw 196 on an inclined pivot pin 198 and the opposite ends of the pivot pin are journaled in suitable bearing bushings 200 in a bracket 202. Each of the brackets 202 is mounted by a central screw 204 on the corresponding platform 110 and is secured against rotation on the platform by a suitable key or dowel 205.

The sleeve 195 that carries the spindle 194 has a control arm 206 for oscillation of the idler roller 114 about the axis of inclined pivot pin 198. As best shown in FIG. 15, the two control arms 206 of the two idler rollers 114 at each winding station are connected by a pair of corresponding links 208 to an angular bracket 210. All of the angular brackets 210 of the two rows of winding stations are fixedly mounted on a longitudinally reciprocative shaft 212 that is slidingly mounted in suitable bearings 214. It is apparent that the shaft 212 may be reciprocated longitudinally to cause simultaneous oscillation of all of the idler rollers 114 of the two rows of winding stations.

As may be seen in FIG. 15, the two beveled idler rollers 114 at each winding station are relatively close together with their beveled surfaces tangential to the ball B. As may be seen in FIG. 14 the axis of the drive roller 112 at each winding station is positioned in a direction approximately 45 degrees downward from the center of the ball B. The axis of oscillation of each of the idler rollers 114 i.e. the axis of the inclined pivot pin 198 passes through the point of tangential contact of the beveled idler roller with the periphery of the ball B and intersects the center of the ball at an angle of 45 degrees downward from the horizontal.

The oscillating action of the two beveled idler rollers 114 and their effect on the rotation of the ball B may be understood by reference to FIGS. 18 to 23. FIGS. 18 and 19 show both of the idler rollers 114 at their mid points of oscillation and horizontal axis 215 passing through points 1800 and 1801 on the surface of the ball at this moment. Axis 215 will pass through points 1900 and 1901 upon completion of one complete revolution of the ball by roller 112 and the ball will be rotated through an angle α around a vertical axis 217 illustrated in FIG. 19, passing through the center of the ball, and being rotated in the direction of an arrow 219, this angle corresponding to angle α illustrated in FIG. 1. FIGS. 20 and 21 show the two idler rollers at one extreme of their range of oscillation; and FIGS. 22 and 23 show the two idler rollers at the other extreme of their range of oscillation. In FIGS. 20 and 21, axis 215 is passing through points 2000 and 2001 on the surface of the ball and the two axes 216 and 215 subtend an angle $+\beta$. In FIGS. 22 and 23, the two axes 215 and 216 subtend an angle $-\beta$ and axis 215 passes through points 2200 and 2201 on the surface of the ball. The axis of rotation of the ball B is indicated by the broken line 215. FIGS. 18, 20 and 22 are the plan, or top, views, while FIGS. 19, 21 and 23 are the side views in the direction of arrows 19—19, 21—21 and 23—23. In FIGS. 18 and 19, this axis 215 is parallel with the axis of rotation 216 of the drive roller 112. The axis 215 of the ball oscillates in a single plane passing through the axis 216 and through the center of the ball, and, except for the momentary transition position of the axis shown in FIG. 18, the axis 215 intersects the axis 216 as shown in FIGS. 20 through 23.

The two axes of rotation 218 of the two idler rollers 114 oscillate in the plane passing through the axis of rotation 215 of the ball B and constantly intersects the axis 215. While this arrangement of two beveled idler rollers differs somewhat from the arrangement of idler rollers in the first described apparatus, the winding operation is performed in the same manner and is characterized by the same winding cycles as heretofore described.

Any suitable means may be provided to actuate the two drive shafts 170 and 172 in unison and to reciprocate the shaft 212 in the desired time relation to rotation of the two drive shafts. In this particular embodiment of the invention, the actuation of the two drive shafts and the reciprocative shaft is accomplished at a control station on a control platform 220 shown in 9a, this platform being elevated to approximately the level of the platforms 110 of the two rows of winding stations.

For a more detailed description of the functional cycle of the control system illustrated in FIGS. 9a, 10–13 and 17, reference is made to the divisional application, Serial No. 142,272, filed October 2, 1961.

A single drive motor (not shown) below the platform 220 actuates the entire machine, including the control system. Its shaft has a drive sprocket 222 and a sprocket chain 224 extends upward therefrom through a slot 225 in the platform to a sprocket 226 on a countershaft 228. The countershaft 228 is journaled in a pair of bearings 230 and is connected by couplings 232 with two gear boxes 234 and 235. The gear box 234 drives the previously mentioned drive shaft 170 and the gear box 235 drives the second drive shaft 172. Accordingly, all of the drive rollers 112 are driven by the above-mentioned single motor at a substantially constant speed. The motor need not be a synchronous motor because the entire system is driven by the single motor.

The drive shaft 170 extends through the gear box 234 into an electrically controlled dwell clutch 236 and carries a sprocket 238. The sprocket 238 is connected by a sprocket chain 240 with a sprocket 242 that is operatively connected to gearing in a gear box 244. A shaft 245 extending from the gear box 244 carries a counting cam 246 (FIGS. 9a and 13). A stud 248 on the face of the counting cam actuates the operating arm 250 of a suitable normally closed switch 252 and thereby creates the required footage pulses for controlling the previously mentioned counters 190 at the various winding stations.

The dwell clutch 236 releasably connects the drive shaft 170 with a stub shaft 254 that is journaled in a pair of spaced bearings 255 and carries what may be termed a dwell-timing cam 256 (FIGS. 9a and 12). This cam has two diametrically opposite lugs 258 on its face for actuating the operating arm 260 of a normally closed, dwell-timing cam switch 262. The stub shaft 254 is provided with an electrically controlled brake 263.

The second drive shaft 172 extends through the gear box 235 and carries a sprocket 264 that is connected by a sprocket chain 265 with a second sprocket 266. The second sprocket 266 is on a countershaft 268 that is journaled in a bearing 270 and extends into an electrically controlled oscillation clutch 272. The oscillation clutch 272 releasably connects the countershaft 268 with a short shaft 274 that extends through a gear box 275. The short shaft 274 carries what may be termed a dwell-selector cam 276 (FIGS. 9a and 11) having a single lug 278 for actuation of the operating arm 280 of a left dwell switch 282 and alternately for actuation of the operating arm 284 of a right dwell switch 285. Both of these switches are normally open. A stub shaft 286 extending from the gear box 275 carries a crank 288 having a crankpin 289 and this crankpin actuates a connecting rod 290 that is connected by a pivot pin 292 to the end of the previously mentioned reciprocative shaft 212.

The short shaft 274 extends from the gear box 275 into an electrically controlled oscillation brake 294 and also carries a sprocket 295. The sprocket 295 is connected by a sprocket chain 296 with a sprocket 298 on a stub shaft 300 that extends into a gear box 302. A stub shaft 304 carried by the gear box 302 mounts what may be termed a master dwell cam 305 (FIGS. 9a and 10). This cam carries a single lug 306 to actuate the operating arm 308 of a normally open master dwell cam switch 310.

The manner in which control system shown in FIG. 9a operates may be understood by reference to the wiring diagram in FIG. 17. Alternating current is supplied by a pair of leads 312 and 314 and is rectified by a full wave rectifier 315 to supply direct current to a pair of leads 316 and 318, the direct current being employed to energize the two sets of clutches and brakes. A relay coil R controls a set of three relay contactors R–1, R–2 and R–3. There is one circuit for energizing the relay coil R and a second circuit for de-energizing the coil.

The circuit for energizing the relay coil R comprises the master dwell cam switch 310 and the left and right dwell switches 282 and 285 in parallel therewith. The master dwell cam switch 310 is connected to the A.C. lead 312 and is connected to the left and right dwell switches 282 and 285 by a wire 320 and branch wires 322 and 324. The second sides of the left and right dwell switches 282 and 285 are connected to a wire 325 which, in turn, is connected to the relay coil R by a wire 326. The second side of the relay coil R is connected to the second A.C. lead 314.

The alternate circuit for energizing the relay coil R includes the dwell-timing cam switch 262 and the contactor R–1, this contactor closing the circuit to lock relay R as long as the dwell-timing cam switch 262 is closed. The dwell-timing cam switch 262 is directly connected to the A.C. lead 312 and is connected by a wire 323 with one of the two contacts associated with the contactor R–1, the other of the two contacts being connected to the previously mentioned wire 326 by a wire 330.

When a predetermined number of revolutions of the two drive shafts 170 and 172 for actuating the driving rollers 112 at the multiple winding stations are completed to carry out a selected winding cycle on the balls B at the winding stations, the lug 306 on the master dwell cam 305 closes the normally open switch 310 momentarily and before this switch opens, the lug 278 on the dwell-selector cam 276 closes either the left dwell switch 282 or the right dwell switch 285, thereby energizing the relay coil R. Energization of the relay coil R actuates the relay contact R–1 to lock the relay, the normally closed dwell timing cam switch 262 being closed at this time. After a predetermined degree of rotation of the two driving shafts 170 and 172, one of the lugs 258 of the dwell-timing cam 256 momentarily opens the normally closed dwell-timing cam switch 262 to de-energize the relay coil R.

As long as the relay coil R is de-energized the contactors R–2 and R–3 energize the dwell brake 263 and the oscillation clutch 272 respectively. The circuit through the dwell brake 263 includes one of the two contacts associated with the contactor R–2, which contact is directly connected to the D.C. lead 316, the other of the two contacts being connected to one side of the dwell brake 263 by a wire 330. The second side of the dwell brake 263 is connected directly to the second D.C. lead 318.

The circuit through the oscillation clutch 272 includes one of the two contacts associated with the contactor R–3, which contact is directly connected to the D.C. lead 316 and includes a wire 332 that connects the other of the two contacts with one side of the oscillation clutch 272. The other side of the oscillation clutch 272 is directly connected to the second D.C. lead 318.

When the relay coil R is energized, contactors R-2 and R-3 de-energize the dwell brake 263 and oscillation clutch 272, respectively, and energize the dwell clutch 236 and the oscillation brake 294, respecitvely. The circuit through the dwell clutch 236 includes one of the two contacts associated with the contactor R-2, which contact is directly connected to the D.C. lead 316, and includes a wire 334 that connects the other of the two contacts with the dwell clutch. The other side of the dwell clutch 236 is directly connected to the second D.C. lead 318. The circuit for energizing the oscillation brake 294 includes one of the two contacts associated with the contactor R-3, which contact is connected directly to the D.C. lead 316, and includes a wire 336 that connects the second contact with the oscillation brake. The other side of the oscillation brake is directly connected to the second D.C. lead 318.

It is apparent that the dwell brake 263 and the oscillation clutch 272 are normally energized during a winding cycle, the dwell brake being effective to immobilize the dwell timing cam 256 and the oscillation clutch being engaged for actuation of both the oscillation crank 288 and the master dwell cam 305. At the end of a predetermined winding cycle the master dwell cam 305 closes the master dwell cam switch 310 and the dwell-selector cam 276 closes either the left dwell switch 282 or the right dwell switch 285 to energize the relay coil R.

The relay, which locks itself, de-energizes both the dwell brake 263 and the oscillation clutch 272 and energizes both the dwell clutch 236 and the oscillation brake 294. Energization of the dwell clutch 236 causes actuation of the normally idle dwell-timing cam 256 and energization of the oscillation brake 294 stops both the oscillation crank 288 and the master dwell cam 305. The arrangement may be such, however, that the master dwell cam 305 in coming to a stop coasts sufficiently to carry the cam lug 306 beyond the operating arm 308 of the master dwell cam switch 310 so that the master dwell cam switch 310 remains closed momentarily. Alternatively, switches 282 and 285 may subsequently open.

The dwell timing cam 256 rotates to a predetermined extent and then opens the normally closed dwell timing cam switch 262 to break the relay circuit. Breaking the relay circuit to restore the contactors R-1, R-2 and R-3 to their normal position restores normal operation for the next winding cycle.

The lug 278 of the dwell-selector cam 276 operates the left dwell switch 282 and the right dwell switch 285 alternately at the ends of the successive winding cycles. Thus at the end of one winding cycle the crank-pin 289 of the crank is stopped at a diametrically opposite leftward position. Consequently one winding cycle terminates with all of the idler rollers 114 at their extreme rightward positions of oscillation and the next winding cycle terminates with all the idler rollers in their extreme leftward positions of oscillation.

It is to be understood that the wound layer is not necessarily the carcass layer of the ball. In fact a feature of one practice of the invention is the use of a winding technique to form an outer, inner and/or undercover layer, this technique having special usefulness in providing ball covers of materials that cannot be applied by existing methods. The winding material used in this particular practice of the invention should be uncured when applied and then cured. Suitable materials for this purpose include vinyl resins, polyesters, rubber latex and moldable nylon.

It is to be understood further that one or more strands of a filamentary material may be wound on a ball simultaneously and further that these strands need not necessarily be braded.

In all the embodiments of the invention, the function of the apparatus is identical. This apparatus may be alternatively and generically described as first means to support the ball in a position such that it may be rotated about first and second axes simultaneously without translational movement of its center. This first means preferably includes two idler rollers similar to idler rollers 44 or 114, a drive roller similar to drive roller 34 or 112, and a small roller or caster 50 or 146. Second means then should be provided to rotate the ball about the first axis, the first axis being an axis parallel to the axis of rotation of the drive roller through the center of the ball. Third means fixed in space should be provided to contact the ball for rotating the ball about the second axis in a first direction for a period equal to the time required for the ball to make one-half revolution about the first axis, and for rotating the ball about the second axis in a second direction, opposite the first direction, for the next succeeding half revolution of the ball during its half period of rotation about the first axis. This third means includes simply the idler rollers 44 or 114. They provide synchronous movement with the angular movement of the ball B which turns the ball continuously in a single direction about the second axis. This second axis generally will be canted rearwardly at the top of the ball B as viewed from the side of the ball B on which the drive roller 34 or 112 is located. This axis will then be perpendicular to a plane through a horizontal line intersecting the center of the ball and parallel to the axis of the drive roller. The angular position of the plane will then be determined by the contact point of the ball B on the drive roller.

It is to be noted that even though the idler rollers turn in one direction and then in another, i.e. oscillate in simple harmonic motion, since the ball's rotation about its axis parallel to the axis of the drive roller is synchronous with the driving movement of the idler rollers 44 or 114, the ball B will ultimately be turned constantly in one direction about the above mentioned second axis during the wind period. In this regard, it is to be noted that although the motion of the idler rollers need not be exactly simply harmonic motion, it is advantageous that the angular velocity function of their oscillatory movements be symmetrical about their quarter periods in order to produce a uniform winding layer. Further, it is desirable that the velocity function never have an infinite slope in order to minimize the possibility of the filamentary material from being wound off of the ball B. Specifically, preferably the driving roller rotates at a constant velocity, and the idler rollers oscillate at a variable angular velocity function $\omega(t)$ of time $t$, the function $\omega(t)$ between $t = t_0$ and $$t = \frac{T}{2} + t_0$$

being symmetrical about $$t = \frac{T}{4} + t_0$$

where T is the period of revolution of the ball about the first axis and $t = t_0$ at $\omega(t) = 0$, the function $\omega(t)$ between $$t = \frac{T}{2} + t_0 \text{ and } t = T + t_0$$

being symmetrical about $$t = \frac{3T}{4} + t_0$$

and the function $\omega(t)$ between $t = t_0$ and $t = T + t_0$ also being symmetrical about the pole $$\left( \omega(t) = 0, \ t = \frac{T}{2} + t_0 \right)$$

where $$\omega(t) \text{ at } t = \frac{T}{4} + t_0$$

is equal to its positive maximum value and at $$t = \frac{3T}{4} + t_0$$

is equal to its negative minimum value, the absolute values of the maxima and minima being equal to each other, and where $$\omega(t) = 0 \text{ both at } t = \frac{T}{2} + t_0$$

and at $t = T + t_0$. To the present time, it has been necessary to make $\omega(t) = 0$ at appropriate times in order to produce crossovers at diametrically opposed points. This is of course necessary in order to produce a ball of a uniform winding thickness with a minimum amount of filamentary material.

My description in specific detail of selected practices and embodiments of the invention, by way of example and to illustrate the underlying principles, will suggest various changes, substitutions and other departures from my disclosure that properly lie within the spirit and scope of the appended claims.

What is claimed is:

1. In an apparatus for winding a strand on a ball, the combination of: a first drive roller positioned for tangential contact with the ball; first power means to rotate said first driver roller; second and third rollers respectively positioned on opposite sides of a plane perpendicular to the axis of rotation of said first drive roller, said second and third rollers making peripheral contact with the ball at two respective points, each spaced less than 180 degrees around the ball from the point of contact of said first drive roller; second power means connected to said second and third rollers to oscillate said second and third rollers about their respective diameters through their points of contact with the ball; and means to guide said strand to the rotating ball.

2. An apparatus as set forth in claim 1 in which said means to guide the strand to the ball is positioned substantially in the plane of rotation of said drive roller.

3. A combination as set forth in claim 1 in which said second and third rollers are beveled rollers.

4. An apparatus as set forth in claim 3 in which said second and third rollers are positioned to cause the ball to rotate about an oscillating axis that continually substantially intersects the axis of rotation of the first drive roller.

5. An apparatus as set forth in claim 4 in which the axes of oscillation of the second and third rollers substantially intersect the oscillating axis of rotation of the ball.

6. An apparatus as set forth in claim 1 in which said second power means to oscillate said second and third rollers and said first power means are synchronized with each other to cause one complete oscillation of said second and third rollers to occur in a time interval at least approximating one rotation of the ball by said first power means so that a reversal in the oscillation of the axis of rotation of the ball, produced by the oscillation of said second and third rollers, occurs at approximately each half revolution of the ball to cause the strand to be wound on the ball in approximate great circles with successive turns passing through the same pair of diametrically opposite polar regions of the ball and with the successive approximate great circles being successively displaced from each other angularly.

7. An apparatus as set forth in claim 1 which also includes control means actuated by said first power means to stop said second power means for a predetermined period of time and then restart said second power means to make said second and third rollers pause periodically to hold the axis of rotation of the ball substantially stationary to cause shift in the two polar regions of intersection of the turns on the ball.

8. An apparatus as set forth in claim 1 in which said second power means to oscillate said second and third rollers includes cam means to goven the oscillation of said second and third rollers, said cam means having a plurality of groups of hills and dales following each other, said groups being spaced from each other by dwell surfaces on the periphery of said cam means to interrupt the oscillation of said second and third rollers periodically.

9. An apparatus as set forth in claim 8 in which said dwells have alternate levels to cause interruptions in the oscillations of said second and third rollers to occur alternately at the opposite limits of oscillation of said second and third rollers.

10. An apparatus as set forth in claim 1 in which said second power means to oscillate said second and third rollers includes: a rotatable shaft to oscillate said second and third rollers; timer means; means to intitiate a timing cycle by said timer means and clutch means controlled by said timer means and connected to said shaft, said timer means disconnecting said clutch means, said second power means being ineffective for the duration of the timing cycle; said timer means reactuating said clutch means to restore the effectiveness of said second power means at the end of a timing cycle.

11. An apparatus as set forth in claim 1 in which said means to oscillate the second and third rollers includes: means to oscillate the two idler rollers; means to energize said oscillating means; means to brake said oscillating means; and means to make said energization means and said braking means effective alternately, thereby to cause said second and third rollers to oscillate with periodic pauses in their oscillation.

12. An apparatus as set forth in claim 11 which includes: a normally closed first circuit to energize said oscillating means; a normally open second circuit to energize said braking means; and means to open said first circuit and close said second circuit periodically.

13. An apparatus as set forth in claim 12 which includes timer means responsive to operation of said oscillating means to open said first circuit and close said second circuit; and which includes means responsive to the timer means to close said first circuit and open said second circuit.

14. An apparatus for winding a filamentary material on a spherical body including a first drive roller supporting said body at a first point, first power means to rotate said first roller, second and third free rollers to support said body at second and third points spaced from each other and from said first point, two of said points always being in one hemisphere defined by a vertical plane passing through the center of said body and the other remaining point being in the other hemisphere, all of said points being in the lower hemisphere of the body defined by a horizontal plane passing through the center of said body, said first, second and third rollers being in first, second and third planes, said second and third planes normally being disposed at equal angles with respect to and on opposite sides of said first plane, said second and third planes intersecting said first plane in a single line; said first, second and third rollers supporting said body at said first, second and third points permitting the simultaneous rotation of said body about first and second perpendicular axes without translational movement of its center, said first drive roller rotating said body about said first axis only when said second and third rollers are in said second and third planes, second power means to oscillate said second and third rollers simultaneously first to the right and then to the left of their symmetrical position with respect to said first plane, said second power means and the oscillation of said first and second rollers by means of said second power means producing a corresponding rotation of said body around said second axis simultaneously with its rotation about the first axis, said first and second power means being synchronized so as to produce the rotation of said body about said second axis in a first direction for and during approximately one-half revolution of said body about said first axis and for planes perpendicular to the respective axes of said idler rollers through their respective points of contact with said body, said second and third planes being disposed at equal angles with said first plane and on each side thereof when said idler ollers are disposed in a centered, or symmetrical, position with respect to said body and said first plane, the points of contact of said frusto-conical idler rollers with said body lying on a line perpendicular to said first plane and parallel to the axis of rotation of said drive roller; means to oscillate each idler roller simultaneously from said centered position about an axis extending perpendicularly to the axis of rotation of each idler roller and through the respective point of contact of each idler roller with said body, said idler rollers being oscillated synchronously with the rotation of said drive roller and at a rate of speed to complete one oscillation for one complete revolution of said body by said drive roller; a guide loop disposed approximately in a plane perpendicular to the axis of said drive roller through the center of said body; and a spool of said filamentary material disposed below said guide loop, said filamentary material extending upwardly through said guide loop and onto said body between said drive roller and said body, said drive roller having a central groove around its circumference both to maintain the center of said body in a fixed spacial position and to receive said filamentary material.

21. An apparatus for rotation of and for winding a filamentary material on a spherical body, the combination comprising: a drive roller; means to rotate said drive roller constantly in the same direction; a frusto-conical idle roller on each side of a first plane perpendicular to the axis of said drive roller and passing through the center of said body, all of said rollers being positioned for tangential contact with said body; second and third planes being perpendicular to the respective axes of said idler rollers through their respective points of contact with said body, said second and third planes being disposed at equal angles with said first plane and on each side thereof when said idler rollers are located in a centered, or symmetrical, position with respect to said body and said first plane, the points of contact of said frusto-conical idler rollers with said body lying on a line perpendicular to said first plane and parallel to the axis of rotation of said drive roller; means to oscillate each idler roller simultaneously from said centered position about an axis extending perpendicularly to the axis of rotation of each idler roller and through the respective point of contact of each idler roller with said body, said idler rollers being oscillated synchronously with the rotation of said drive roller and at a rate of speed to complete one oscillation for one complete revolution of said body by said drive roller, said means to oscillate said idler rollers including a shaft having a mechanical linkage with each of said idler rollers and means to reciprocate said shaft to cause said idler rollers to oscillate, said means to oscillate said idler rollers also including means to reciprocate said shaft to cause said idler rollers to oscillate at a variable angular velocity, said angular velocity being a variable function $\omega(t)$ of time $t$, said function $\omega(t)$ between $$t=t_0 \text{ and } t=\frac{T}{2}+t_0$$

being symmetrical about $$t=\frac{T}{4}+t_0$$

where T is the period of revolution of the ball about said first axis and $t=t_0$ at $\omega(t)=0$, said function $\omega(t)$ between $$t=\frac{T}{2}+t_0$$

and $T+t_0$ being symmetrical about $t=T+t_0$ also being symmetrical about the pole $$\left(\omega(t)=0, \quad t=\frac{T}{2}+t_0\right)$$

is equal to its positive maximum value and at $$t=\frac{3T}{4}+t_0$$

is equal to its negative minimum value, the absolute values of said maxima and minima being equal to each other, and where $\omega(t)=0$ both at $$t=\frac{T}{2}+t_0$$

and $t=T+t_0$; and means to guide said filamentary material onto said body at a point fixed in space in a plane through the center of said body perpendicular to the axis of said drive roller.

22. An apparatus for rotation of and for winding a filamentary material on a spherical body, the combination comprising: a drive roller, means to rotate said drive roller constantly in the same direction; a frusto-conical idler roller on each side of a first plane perpendicular to the axis of said drive roller and passing through the center of said body, all of said rollers being positioned for tangential contact with said body; second and third planes being perpendicular to the respective axes of said idler rollers through their respective points of contact with said body, said second and third planes being disposed at equal angles with said first plane and on each side thereof when said idler rollers are disposed in a centered, or symmetrical, position with respect to said body and said first plane, the points of contact of said frusto-conical idler rollers with said body lying on a line perpendicular to said first plane and parallel to the axis of rotation of said drive roller; means to oscillate each idler roller simultaneously from said centered position about an axis extending perpendicularly to the axis of rotation of each idler roller and through the respective point of contact of each idler roller with said body, said idler rollers being oscillated synchronously with the rotation of said drive roller and at a rate of speed to complete one oscillation for one complete revolution of said body, said means to oscillate said idler rollers including a shaft and mechanical linkages from said shaft to each of said idler rollers; means to reciprocate said shaft in approximately simple harmonic motion; and means to guide said filamentary material onto said body at a point fixed in space in a plane through the center of said body perpendicular to the axis of said drive roller.

23. An apparatus for rotation of and for winding a filamentary material on a spherical body, the combination comprising: a drive roller, means to rotate said drive roller constantly in the same direction; a frusto-conical idler roller on each side of a first plane perpendicular to the axis of said drive roller and passing through the center of said body, all of said rollers being positioned for tangential contact with said body; second and third planes being perpendicular to the respective axes of said idler rollers through their respective points of contact with said body, said second and third planes being disposed at equal angles with said first plane and on each side thereof when said idler rollers are located in a centered, or symmetrical, position with respect to said body and said first plane, the points of contact of said frusto-conical idler rollers with said body lying on a line perpendicular to said first plane and parallel to the axis of rotation of said drive roller; means to oscillate each idler roller simultaneously from said centered position about an axis extending perpendicularly to the axis of rotation of each idler roller and through the respective point of contact of each idler roller with said body, said idler rollers being oscillated synchronously with the rotation of said drive roller and at a rate of speed to complete one oscillation rotating said body about said second axis in a second direction, opposite to said first direction, for approximately the next succeeding half revolution of said body about said first axis and synchronously with the rotation of said body about said first axis, whereby said body is in fact rotated only in one direction about said second axis.

15. The invention as defined in claim 14, wherein said first roller rotates at a constant angular velocity; wherein said second power means oscillates at a variable angular velocity, said variable angular velocity being a variable function $\omega(t)$ of time $t$, said function $\omega(t)$ between $t=t_0$ and $$t=\frac{T}{2}+t_0$$

being symmetrical about $$t=\frac{T}{4}+t_0$$

where T is the period of revolution of the body about said first axis and $t=t_0$ at $\omega(t)=0$, said function $\omega(t)$ between $$t=\frac{T}{2}+t_0$$

and $t=T+t_0$ being symmetrical about $$t=\frac{3T}{4}+t_0$$

and said function $\omega(t)$ between $t=t_0$ and $t=T+t_0$ also being symmetrical about the pole $$\left(\omega(t)=0,\ t=\frac{T}{2}+t_0\right)$$

where $$\omega(t) \text{ at } t=\frac{T}{4}+t_0$$

is equal to its positive maximum value and at $$t=\frac{3T}{4}+t_0$$

is equal to its negative minimum value, the absolute values of said maxima and minima being equal to each other, and where $$\omega(t)=0 \text{ both at } t=\frac{T}{2}+t_0$$

and at $t=T+t_0$.

16. The invention as defined in claim 14 wherein movement of said second power means is a simple harmonic motion both to wind said filamentary material on said body with crossovers at diametrically opposed points and to wind a smooth curve on said ball to prevent said filamentary material from rolling off and coming loose from said body.

17. An apparatus for rotation of a spherical body, the combination comprising: a drive roller; means to rotate said drive roller constantly in the same direction; a frusto-conical idler roller on each side of a first plane perpendicular to the axis of said drive roller and passing through the center of said body, all of said rollers being positioned for tangential contact with said body; second and third planes; said second and third planes being perpendicular to the respective axes of said idled rollers and passing through their respective points of contact with said body, said second and third planes being disposed at equal angles with said first plane and on each side thereof when said idler rollers are in a centered, or symmetrical, position with respect to said body and said first plane, the points of contact of said idler rollers with said body lying on a line perpendicular to said first plane and parallel to the axis of rotation of said drive roller; and means to oscillate each idler roller simultaneously from said centered position about an axis extending perpendicularly to the axis of rotation of each idler roller and through the respective point of contact of each idler roller with said body, said idler rollers being oscillated synchronously with the rotation of said drive roller and at a rate of speed to complete one oscillation for one complete revolution of said body by said drive roller.

18. An apparatus for rotation of and for winding a filamentary material on a spherical body, the combination comprising: a drive roller; means to rotate said drive roller constantly in the same direction; a frusto-conical idler roller on each side of a first plane perpendicular to the axis of said drive roller and passing through the center of said body, all of said rollers being positioned for tangential contact with said body; second and third planes being perpendicular to the respective axes of said idler rollers through their respective points of contact with said body, said second and third planes being disposed at equal angles with said first plane and on each side thereof when said idler rollers are disposed in a centered, or a symmetrical, position with respect to said body and said first plane, the points of contact of said frusto-conical idler rollers with said body lying on a line perpendicular to said first plane and parallel to the axis of rotation of said drive roller; means to oscillate each idler roller simultaneously from said centered position about an axis extending perpendicularly to the axis of rotation of each idler roller and through the respective point of contact of each idler roller with said body, said idler rollers being oscillated synchronously with the rotation of said drive roller and at a rate of speed to complete one oscillation for one complete revolution of said body by said drive roller; means to guide said filamentary material onto said body at a point fixed in space in a plane through the center of said body perpendicular to the axis of said drive roller; and an additional idler roller to hold said body in contact with the other three of said rollers.

19. An apparatus for rotation of and for winding a filamentary material on a spherical body, the combination comprising: a drive roller; means to rotate said drive roller constantly in the same direction; a frusto-conical idler roller on each side of a first plane perpendicular to the axis of said drive roller and passing through the center of said body, all of said rollers being positioned for tangential contact with said body; second and third planes being perpendicular to the respective axes of said idler rollers through their respective points of contact with said body, said second and third planes being disposed at equal angles with said first plane and on each side thereof when said idler rollers are disposed in a centered, or a symmetrical, position with respect to said body and said first plane, the points of contact of said frusto-conical idler rollers with said body lying on a line perpendicular to said first plane and parallel to the axis of rotation of said drive roller; means to oscillate each idler roller simultaneously from said centered position about an axis extending perpendicularly to the axis of rotation of each idler roller, and through the respective point of contact of each idler roller with said body, said idler rollers being oscillated synchronously with the rotation of said drive roller and at a rate of speed to complete one oscillation for one complete revolution of said body by said drive roller; a guide loop fixed in space approximately in a plane perpendicular to the axis of said drive roller through the center of said body; and a spool of said filamentary material spaced from said guide loop, said filamentary material extending upwardly through said guide loop and onto said body between said drive roller and said body.

20. An apparatus for rotation of and for winding a filamentary material on a spherical body, the combination comprising: a drive roller; means to rotate said drive roller constantly in the same direction; a frusto-conical idler roller on each side of a first plane perpendicular to the axis of said drive roller and passing through the center of said body, all of said rollers being positioned for tangential contact with said body; second and third for one complete revolution of said body by said drive roller, said means to oscillate said idler rollers including a shaft and mechanical linkages from said shaft to each of said idler rollers, and means to reciprocate said shaft in approximately simple harmonic motion; means to maintain said shaft stationary periodically for a predetermined dwell period; and means to guide said filamentary material onto said body at a point fixed in space in a plane through the center of said body perpendicular to the axis of said drive roller.

24. An apparatus for rotation of and for winding a filamentary material on a spherical body, the combination comprising: a drive roller; means to rotate said drive roller at a constant velocity in the same direction; a frusto-conical idler roller on each side of a first plane perpendicular to the axis of said drive roller and passing through the center of said body, all of said rollers being positioned for tangential contact with said body; second and third planes being perpendicular to the respective axes of said idler rollers through their respective points of contact with said body, said second and third planes being disposed at equal angles with said first plane and on each side thereof when in a centered, or symmetrical, position with respect to said body and said first plane, the points of contact of said frusto-conical idler rollers with said body lying on a line perpendicular to said first plane and parallel to the axis of rotation of said drive roller; means to oscillate each idler roller simultaneously from said centered position about an axis extending perpendicularly to the axis of rotation of each idler roller and through the respective points of contact of each idler roller with said body, said idler rollers being oscillated synchronously in simple harmonic motion with the rotation of said drive roller and at a rate of speed to complete one oscillation for one complete revolution of said body by said drive roller; and means to guide said filamentary material onto said body at a point fixed in space in a plane through the center of said body perpendicular to the axis of said drive roller.

25. In an apparatus for turning a spherical body, the combination of: a drive roller positioned for tangential contact with the body; two additional rollers spaced apart and positioned on opposite sides of a plane perpendicular to the axis of rotation of said drive roller, said plane also passing through the center of said body, said two additional rollers making two respective peripheral contacts with the body at respective points spaced equal distances from said plane and from said drive roller; and means to oscillate said two additional rollers about their diameters through their points of contact with said spherical body.

26. In an apparatus for winding a strand on a body having a surface at least a portion of which is approximately spherical, the combination of: a drive roller positioned for tangential contact with said body; first and second idler rollers positioned on opposite sides of a first plane perpendicular to the axis of rotation of said drive roller through the center of said body for peripheral contact with the body at points spaced both from said drive roller and from each other; means to oscillate said first and second idler rollers about their diameters through their points of contact with the body; and a third idler roller to contact said body at a point spaced from the other of said idler rollers and said drive roller, said first and second idler rollers and said drive roller having points of contact with said body defining a second plane through said body spaced in a predetermined direction from the center thereof, a third plane parallel to said second plane through the point of contact of said third idler roller with said body being spaced from the center thereof in a direction opposite said predetermined direction.

27. In an apparatus for winding a strand on a body having a surface at least a portion of which is approximately spherical, the combination of: a drive roller positioned for tangential contact with said body; first and second idler rollers positioned on opposite sides of a first plane perpendicular to the axis of rotation of said drive roller through the center of said body for peripheral contact with the body at points spaced both from said drive roller and from each other; means to oscillate said first and second idler rollers about their diameters through their points of contact with the body; a third idler roller to contact said body at a point spaced from the other of said idler rollers and said drive roller, said first and second idler rollers and said drive roller having points of contact with said body defining a second plane through said body spaced in a predetermined direction from the center thereof, a third plane parallel to said second plane through the point of contact of said third idler roller with said body being spaced from the center thereof in a direction opposite said predetermined direction; and means to guide said strand onto said body approximately at a point fixed in space in said first plane.

28. In an apparatus for winding a filamentary material on a body having a surface at least a portion of which is approximately spherical, the combination comprising: a drive roller; means to rotate said drive roller substantially constantly in the same direction; an idler roller on each side of a predetermined plane perpendicular to the axis of said drive roller extending through the center of said body, all of said rollers being positioned for tangential contact with said body, planes perpendicular to the axes of said idler rollers, their respective points of contact being disposed at approximately equal angles with said predetermined plane on each side thereof when said idler rollers are in a centered position; and means to oscillate each idler roller simultaneously from said centered position about an axis extending approximately perpendicularly to the axis of rotation of each and through the respective points of contact of each with said body, said idler rollers being oscillated synchronously with the rotation of said drive roller and at a rate of speed to complete approximately one oscillation for one complete revolution of said body by said drive roller.

29. In an apparatus for winding a filamentary material on a body having a surface at least a portion of which is approximately spherical, the combination comprising: a drive roller; means to rotate said drive roller substantially constantly in the same direction; an idler roller on each side of a predetermined plane perpendicular to the axis of said drive roller extending through the center of said body, all of said rollers being positioned for tangential contact with said body, planes perpendicular to the axes of said idler rollers through their respective points of contact being disposed at approximately equal angles with said predetermined plane on each side thereof when said idler rollers are in a centered position; means to oscillate each idler roller simultaneously from said centered position about an axis extending approximately perpendicularly to the axis of rotation of each and through the respective points of contact of each with said body, said idler rollers being oscillated synchronously with the rotation of said drive roller and at a rate of speed to complete approximately one oscillation for one complete revolution of said body by said drive roller; and means to guide said filamentary material onto said body at a point fixed in space approximately in a plane through the center of said body perpendicular to the axis of said drive roller.

References Cited in the file of this patent

UNITED STATES PATENTS

| Number | Name | Date |
| --- | --- | --- |
| 397,303 | Newell | Feb. 5, 1889 |
| 822,482 | Saunders | June 5, 1906 |
| 2,194,132 | Voit et al | Mar. 19, 1940 |
| 2,519,069 | Roberts | Aug. 15, 1950 |
| 2,660,379 | Rekettye | Nov. 24, 1953 |